(12) United States Patent
Rahman et al.

(10) Patent No.: US 9,525,445 B2
(45) Date of Patent: Dec. 20, 2016

(54) METHOD AND APPARATUS OF UPLINK INTERFERENCE SUPPRESSION AND CANCELLATION FOR ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Young-Han Nam, Plano, TX (US); Dexin Wang, Fort Collins, CO (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/968,680

(22) Filed: Dec. 14, 2015

(65) Prior Publication Data

US 2016/0173152 A1    Jun. 16, 2016

Related U.S. Application Data

(60) Provisional application No. 62/092,139, filed on Dec. 15, 2014.

(51) Int. Cl.
*H04B 1/00* (2006.01)
*H04B 1/10* (2006.01)

(52) U.S. Cl.
CPC .................... *H04B 1/1027* (2013.01)

(58) Field of Classification Search
CPC .................................................... H04B 1/1027
USPC ............................................................ 455/63.1
See application file for complete search history.

(56) References Cited

U.S. PATENT DOCUMENTS

| | | | |
|---|---|---|---|
| 8,437,298 B2 * | 5/2013 | Fan ...................... | H04B 1/7105 370/329 |
| 8,855,046 B2 * | 10/2014 | Jalloul .................... | H04L 5/023 370/328 |
| 9,014,171 B2 * | 4/2015 | Weng .................... | H04W 72/04 370/336 |
| 2007/0173271 A1 * | 7/2007 | Hulkkonen .......... | H04B 1/1027 455/509 |

(Continued)

OTHER PUBLICATIONS

LTE Advanced, "Evolved Universal Terrestrial Radio Access (E-UTRA); Physical Layer Procedures", 3GPP TS 36.213 Version 11.2.0, Release 11, dated Apr. 2013, 175 pgs.
LTE Advanced, "Evolved Universal Terrestrial Radio Access (E-UTRA); Physical Channels and Modulation", 3GPP TS 36.211 Version 11.2.0, Release 11, dated Apr. 2013, 111 pgs.
LTE Advanced, "Evolved Universal Terrestrial Radio Access (E-UTRA); Multiplexing and Channel Coding", 3GPP TS 36.212 Version 11.2.0, Release 11, dated Apr. 2013, 84 pgs.

(Continued)

*Primary Examiner* — April G Gonzales

(57) ABSTRACT

A base station includes a transceiver and processor. The transceiver receives an uplink signal from each of a plurality of user equipment. UEs comprise desired UEs each with a desired uplink signal and at least one interfering UE with an interfering uplink signal interfering with the received uplink signals. The processor identifies a set of interfering uplink signals from the at least one interfering UE. The set includes at least one interfering uplink signal. The at least one interfering uplink signal overlaps with at least one PRB of the desired uplink signal. The processor identifies one or more subsets of interfering uplink signals from the identified set of interfering uplink signals based on one or more metrics each of which is a function of parameters of the interfering uplink signals. The processor performs interference suppression or interference cancellation on at least one of the one or more identified subsets.

20 Claims, 15 Drawing Sheets

(56) References Cited

U.S. PATENT DOCUMENTS

| | | | | |
|---|---|---|---|---|
| 2009/0017762 | A1* | 1/2009 | Jovicic | H04W 72/082 455/63.1 |
| 2011/0038328 | A1* | 2/2011 | Wang | H04W 72/0413 370/329 |
| 2011/0059713 | A1* | 3/2011 | Okello | H04B 7/0491 455/296 |
| 2014/0044095 | A1* | 2/2014 | Li | H04W 16/14 370/331 |
| 2014/0148179 | A1* | 5/2014 | Das | H04B 1/7107 455/452.1 |
| 2014/0301332 | A1* | 10/2014 | Kim | H04J 11/005 370/329 |
| 2015/0117362 | A1* | 4/2015 | Luo | H04W 24/02 370/329 |
| 2015/0139004 | A1* | 5/2015 | Fodor | H04W 72/082 370/252 |

OTHER PUBLICATIONS

Wax et al., "Detection of Signals by Information Theoretic Criteria", IEEE Transactions on Acoustics, Speech and Signal Processing, vol. ASSP-33, No. 2, Apr. 1985, 6 pgs.

Berardinelli et al., "Turbo Receivers for Single User MIMO LTE-A Uplink", IEEE 978-1-4244-2517-4/09, dated 2009, 5 pgs.

Celebi et al., "Interference Mitigation for LTE Uplink Through Iterative Blanking", IEEE 978-1-4244-9268-8/11 dated 2011,6 pgs.

Jiang et al., "Design of High Performance MIMO Receivers for LTE/LTE-A Uplink", IEEE 978-1-4244-9721-8/10, dated 2010, pp. 1493-1497.

Dhivagar et al., "An Iterative MIMO-DFE Receiver With MLD for Uplink SC-FDMA", IEEE 978-1-4673-5952-8/13, dated 2013, 4 pgs.

International Search Report and Written Opinion issued for PCT/KR2015/013759 dated Apr. 15, 2016, 14 pgs.

3GPP TSG RAN, 3GPP TR 25.820 V8.2.0, "3G Home NodeB Item Technical Report (Release 8)", Sep. 23, 2008, 40 pgs.

* cited by examiner

METHOD AND APPARATUS OF UPLINK INTERFERENCE SUPPRESSION AND CANCELLATION FOR ADVANCED WIRELESS COMMUNICATION SYSTEMS

CROSS-REFERENCE TO RELATED APPLICATION(S) AND CLAIM OF PRIORITY

This application claims priority under 35 U.S.C. §119(e) to U.S. Provisional Patent Application No. 62/092,139 filed on Dec. 15, 2014. The above-identified provisional patent application is hereby incorporated by reference in its entirety.

TECHNICAL FIELD

This disclosure relates generally to uplink signal interference. More specifically, this disclosure relates to a method and apparatus of uplink interference suppression and cancellation for advanced wireless communication systems.

BACKGROUND

In 3GPP Long Term Evolution (LTE) (3GPP LTE), a base station (BS) receives uplink (UL) data signals from a subscriber station within the coverage of the BS as well as other subscriber stations belonging to other BSs. In order to decode uplink data signal, the BS needs to distinguish between a desired signal and interfering signals.

SUMMARY

This disclosure provides a method and apparatus of uplink interference suppression and cancellation for advanced wireless communication systems.

In a first embodiment, a base station includes a transceiver and processor. The transceiver is configured to receive an uplink signal from each of a plurality of user equipment. The plurality of UEs comprises desired UEs each with a desired uplink signal and at least one interfering UE with an interfering uplink signal interfering with the received uplink signals. The processor is configured to identify a set of interfering uplink signals from the at least one interfering UE. The set includes at least one interfering uplink signal. The at least one interfering uplink signal overlaps with at least one PRB of the desired uplink signal. The processor is also configured to identify one or more subsets of interfering uplink signals from the identified set of interfering uplink signals based on one or more metrics each of which is a function of parameters of the interfering uplink signals. The processor is also configured to perform interference suppression or interference cancellation on at least one of the one or more identified subsets.

In a second embodiment, a method includes receiving an uplink signal from each of a plurality of user equipment. The plurality of UEs comprises desired UEs each with a desired uplink signal and at least one interfering UE with an interfering uplink signal interfering with the received uplink signals. The method also includes identifying a set of interfering uplink signals from the at least one interfering UE. The set includes at least one interfering uplink signal. The at least one interfering uplink signal overlaps with at least one PRB of the desired uplink signal. The method also includes identifying one or more subsets of interfering uplink signals from the identified set of interfering uplink signals based on parameters of the interfering uplink signals. The method also includes performing interference suppression or interference cancellation on at least one of the one or more identified subsets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
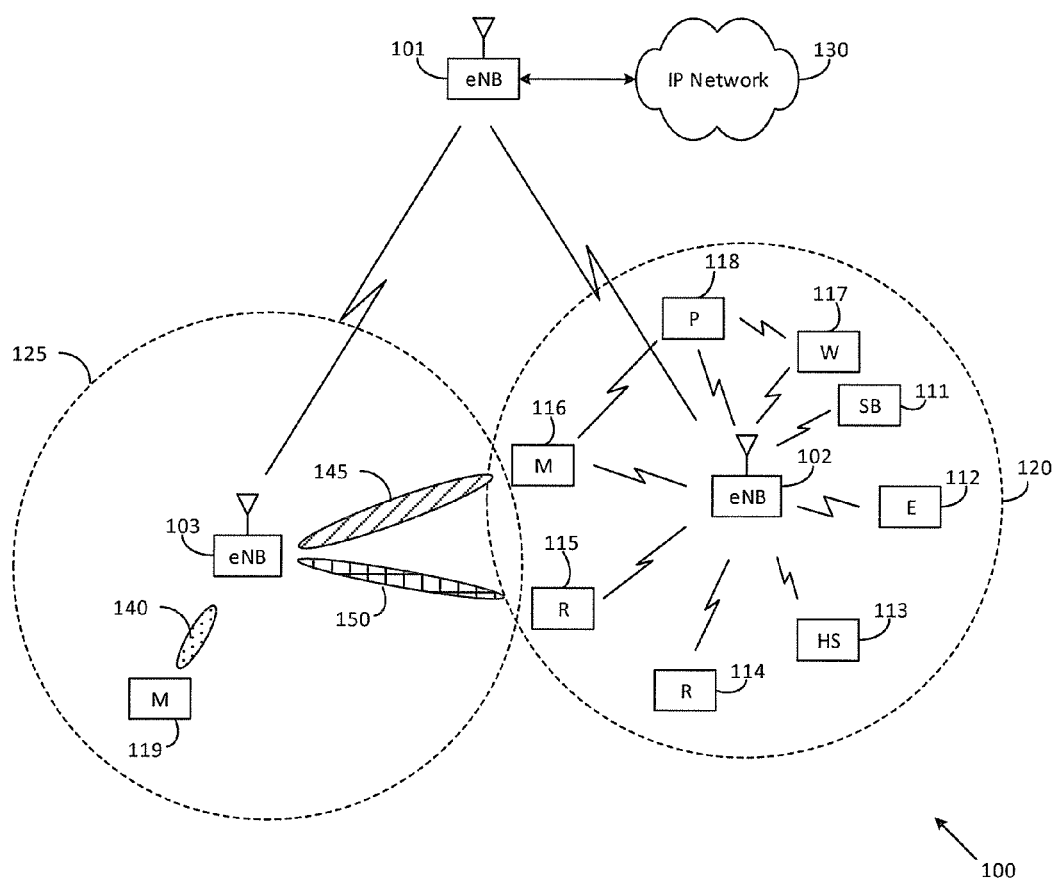
FIG. 1 illustrates an example wireless network according to this disclosure.

FIGS. 1 through 19, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

A description of exemplary embodiments of the present disclosure is provided below. The text and figures of that description are provided solely as examples to aid the reader in understanding the disclosure, and are not intended and are not to be construed as limiting the scope of this disclosure in any manner. Although certain embodiments and examples have been provided, it will be apparent to those skilled in the art based on the description and figures herein that changes in the embodiments and examples shown may be made without departing from the scope of this disclosure. Aspects, features, and advantages of the scheme of the present disclosure are readily apparent from the following detailed description, simply by illustrating a number of particular embodiments and implementations. The scheme of the present disclosure is also capable of other and different embodiments, and its several details can be modified in various obvious respects, all without departing from the spirit and scope of the disclosure. Accordingly, the drawings and description are to be regarded as illustrative in nature, and not as restrictive. The scheme of the present disclosure is illustrated by way of example, and not by way of limitation, in the figures of the accompanying drawings. Therefore, this disclosure covers not only the specific embodiments disclosed in the description herein, but also any other variation and/or combination of any subset of the methods and structures described that is conceivable by those familiar with the art.

The following documents and standards descriptions are hereby incorporated by reference into the present disclosure as if fully set forth herein: (1) 3rd generation partnership project (3GPP) TS 36.211, "E-UTRA, Physical channels and modulation"; (2) 3GPP TS 36.212, "E-UTRA, Multiplexing and channel coding"; and (3) 3GPP TS 36.213, "E-UTRA, Physical layer procedures".

List of acronyms:
2D: two-dimensional
MIMO: multiple-input-multiple-output
SU-MIMO: single-user MIMO
MU-MIMO: multi-user MIMO
3GPP: $3^{rd}$ generation partnership project
LTE: long-term evolution
UE: user equipment
eNB: eNodeB
MS: mobile station
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure
LLR: log likelihood ratio.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a base station 102, and a base station 103. In one example embodiment, the base stations 101-103 can each be an eNodeB (eNB). The base stations 101-103 communicate with at least one Internet Protocol (IP) network 130, such as the Internet, a proprietary IP network, or other data network.

The base station 101 provides wireless broadband access to the network 130 for a first plurality of user equipments (UEs) within a coverage area 119 of the base station 101.

The base station 102 provides wireless broadband access to the network 130 for a first plurality of user equipments (UEs) within a coverage area 120 of the base station 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like.

The base station 103 provides wireless broadband access to the network 130 for a second plurality of UEs within a coverage area 125 of the base station 103. The second plurality of UEs includes UE 119. In some embodiments, one or more of the base stations 101-103 may communicate with each other and with the UEs 111-116 and 119 using 5G, LTE, LTE-A, WiMAX, WiFi, or other wireless communication techniques.

Depending on the network type, other well-known terms may be used instead of "base station," such as "eNodeB," "eNB" or "access point." For the sake of convenience, the terms "base station" and "access point" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BS s and variations in the radio environment associated with natural and man-made obstructions.

In an embodiment of this disclosure, the uplink 140 received signal at base station 103 includes a desired signal from a desired UE 119, and two interfering signals 140 and 145 from two interfering UEs 116 and 115 who transmit signals intended to neighboring base station 102. If the received interference power is high, then decoding of uplink 140 may fail. When the decoding fails, base station 103 may attempt to suppress or cancel at least one interference of signals 140 and 145; for example the most dominant interferer.

For interference suppression (IS), base station 103 estimates interference related parameters (interference DMRS for interference channel estimation) and uses the parameters to refine the estimated parameters related to desired signal decoding (such as desired channel and noise plus interference estimation). For interference cancellation (IC), base station 103 reconstructs the interference signal for at least one dominant interferer and subtracts (cancels) the interference signal from the received signal prior to another decoding attempt. Base station 103 may repeat a interference suppression (IS)/interference cancellation (IC) process multiple times if necessary.

One or more embodiments of this disclosure recognize and take into account that the challenge that base station 103 has is the completely blind nature of interference sensing (BIS) necessary for both IS and IC. Base station 103 has to estimate important interference related parameters such as the number of dominant interferers (DI), and their PRB allocations, DMRS sequences, channels, modulation orders, etc. The information available at base station 103 to estimate all these is received signal and parameters such as desired BW related to the desired signal (MS1).

Although FIG. 1 illustrates one example of a wireless network 100, various changes may be made to FIG. 1. For example, the wireless network 100 could include any number of BS s and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
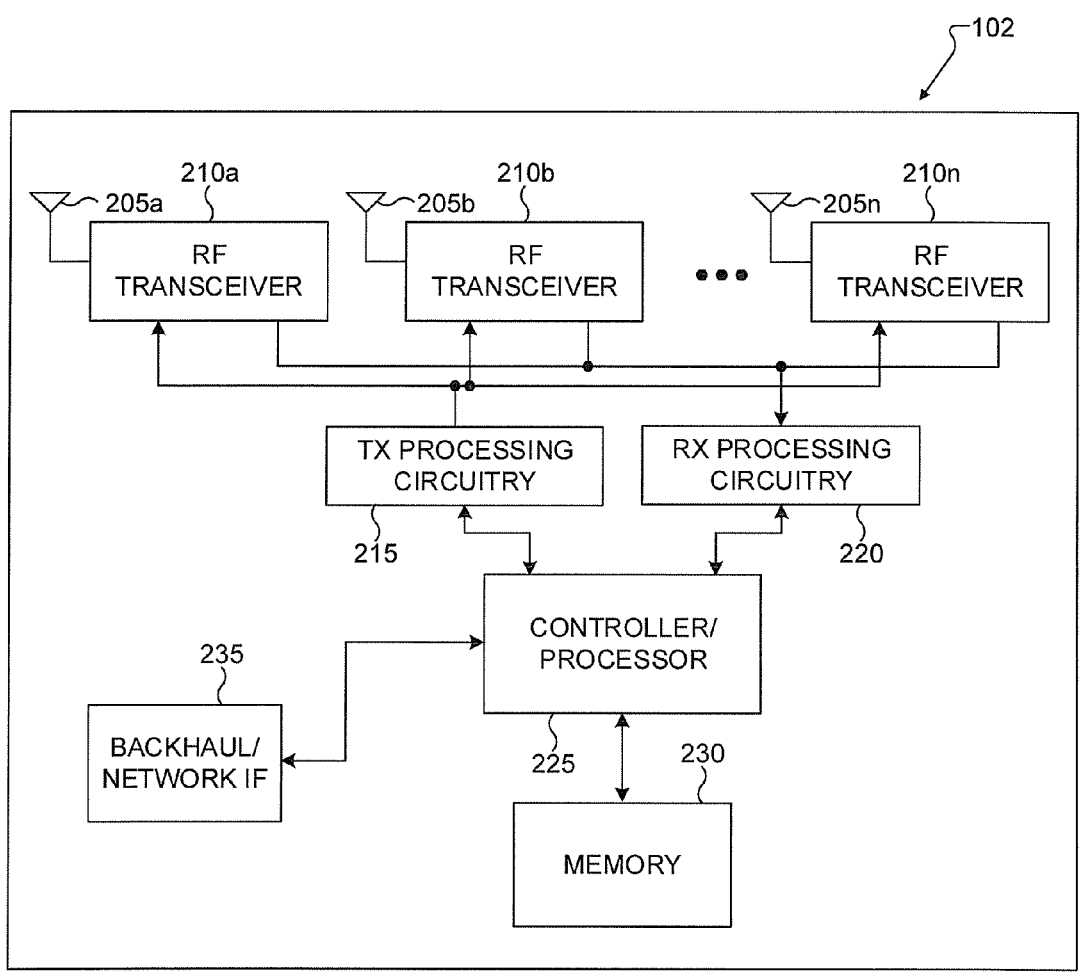
FIG. 2 illustrates an example BS according to this disclosure.

FIG. 2 illustrates an example BS 102 according to this disclosure. The embodiment of the BS 102 illustrated in FIG. 2 is for illustration only, and the BS s 101 and 103 of FIG. 1 could have the same or similar configuration. However, BSs come in a wide variety of configurations, and FIG. 2 does not limit the scope of this disclosure to any particular implementation of an BS.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BS over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
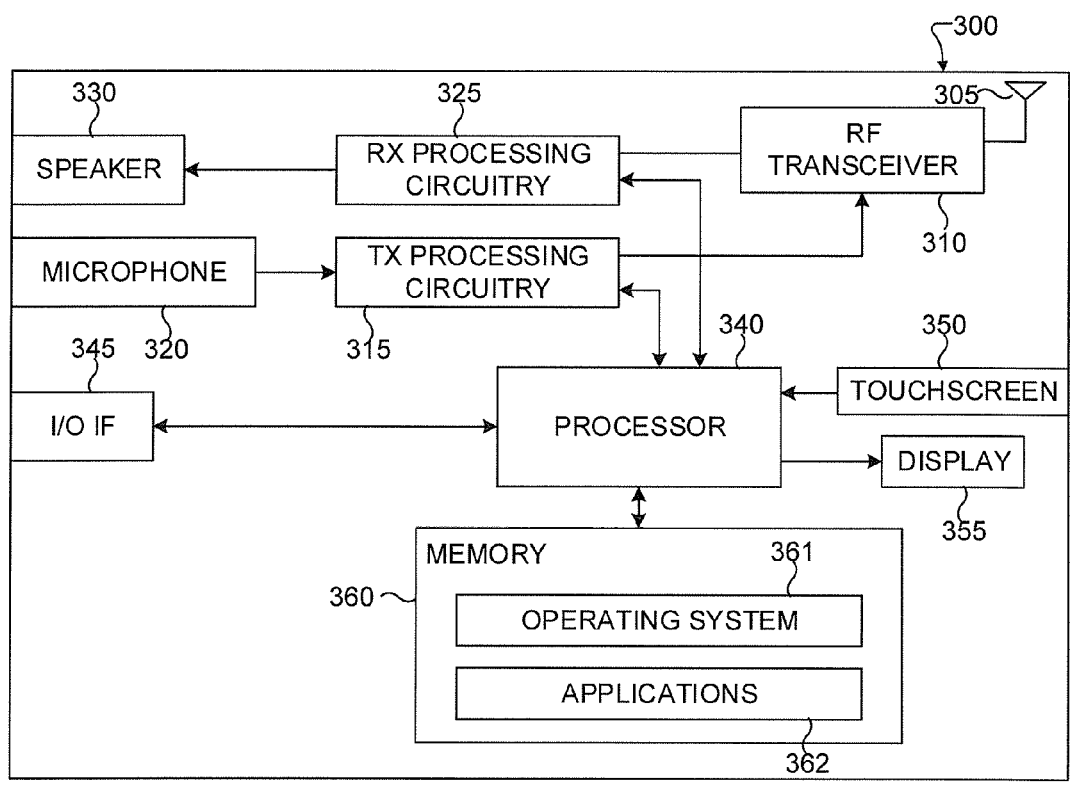
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by an BS of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The RF transceiver 310 can include different RF receives 310a-n. Each RF transceiver 310a-n can communicate over a different network. For example, but not limited to, near field communication networks, local area networks, wide local area networks, and the like. An RF transceiver can be configured to communicate over one networks or more than one network.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from BSs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the touchscreen 350 and the display unit 355. The operator of the UE 116 can use the touchscreen 350 to enter data into the UE 116. The display 355 may be a liquid crystal display, light-emitting diode (LED) display, optical LED (OLED), active matrix OLED (AMOLED), or other display capable of rendering text and/or graphics, such as from web sites, videos, games, etc. The touchscreen 350 can include a touch panel, a (digital) pen sensor, a key, or an ultrasonic input device. The touchscreen 350 can recognize, for example, a touch input in at least one scheme among a capacitive scheme, a pressure sensitive scheme, an infrared scheme, or an ultrasonic scheme. The touchscreen 350 can also include a control circuit. In the capacitive scheme, the touchscreen 350 can recognize touch or proximity.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
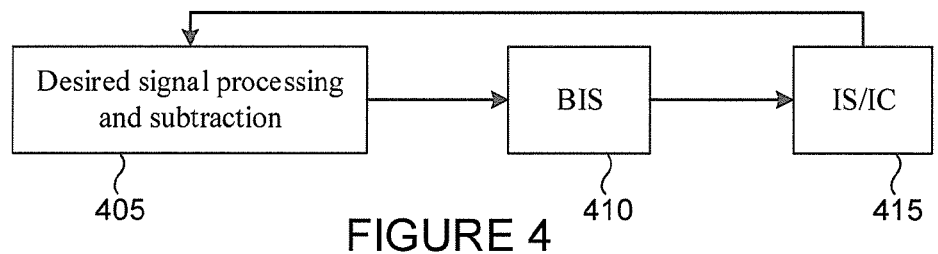
FIG. 4 illustrates a BIS and IS/IC process according to this disclosure.

FIG. 4 illustrates a BIS and IS/IC process according to this disclosure. The embodiment shown in FIG. 4 is for illustration only. Other embodiments could be used without departing from the scope of the present disclosure. A processor, such as controller/processor 225 as shown in FIG. 2, can perform different steps of the BIS and IS/IC process in FIG. 4.

At step 405, a processor can perform desired signal processing and subtraction. The input to this step is the desired users' (or UE's) information such as desired BWs (desired PRB allocations) and the received signal. The main processing includes desired channel estimation and decoding. If the decoding of all desired users succeed, then the algorithm stops; otherwise the desired signal for each desired user, whether successfully decoded or not, is reconstructed and is subtracted out from the received signal, and the resultant signal is sent to step 410 (i.e., BIS). For successfully decoded desired users, the subtraction is based on decoded hard bits, and for the remaining users, it is based on the soft demodulation using soft (LLR) bits.

At step 410, a processor can perform BIS. Using the desired BW and the received signal after desired signal subtraction, the BIS step estimates interference related parameters such as interfering BWs and BIS and IS/IC process sequences for at least one interferer. If no interferer is detected, then the process stops.

At step 415, a processor can perform IS/IC. The estimated interference related parameters from step 410 are used for IS/IC. For IS, the relevant interference parameters are estimated and supplied to the first step (desired signal processing and subtraction) to suppress interference and attempt another decoding of the desired users. For instance, interference channel estimate can be obtained using estimated DMRS from BIS step and a refined desired channel estimate can be obtained after cancelling the interference DMRS from the received DMRS. For IC, the interference signal is reconstructed and subtracted from the received signal. The resultant signal is then sent back to the desired signal processing and subtraction step 405 again for another decoding attempt. To reconstruct interference signal, both interference channel and modulation order are estimated based on the information provided by step 410. For cancellation, the demodulation of interfering users may be soft (i.e., without turbo decoding) based on the soft (LLR) bits. Alternatively, it may be hard based on the decoded interfering user bits.

Steps 405-415 can be repeated until all desired users are successfully decoded or some other stopping criterion such as the maximum number of decoding attempts is met.

For simplicity, the embodiments described herein consider one desired user. However, one skilled-in-the-art may understand that the embodiments are applicable to any number of desired users.

Figure 5:
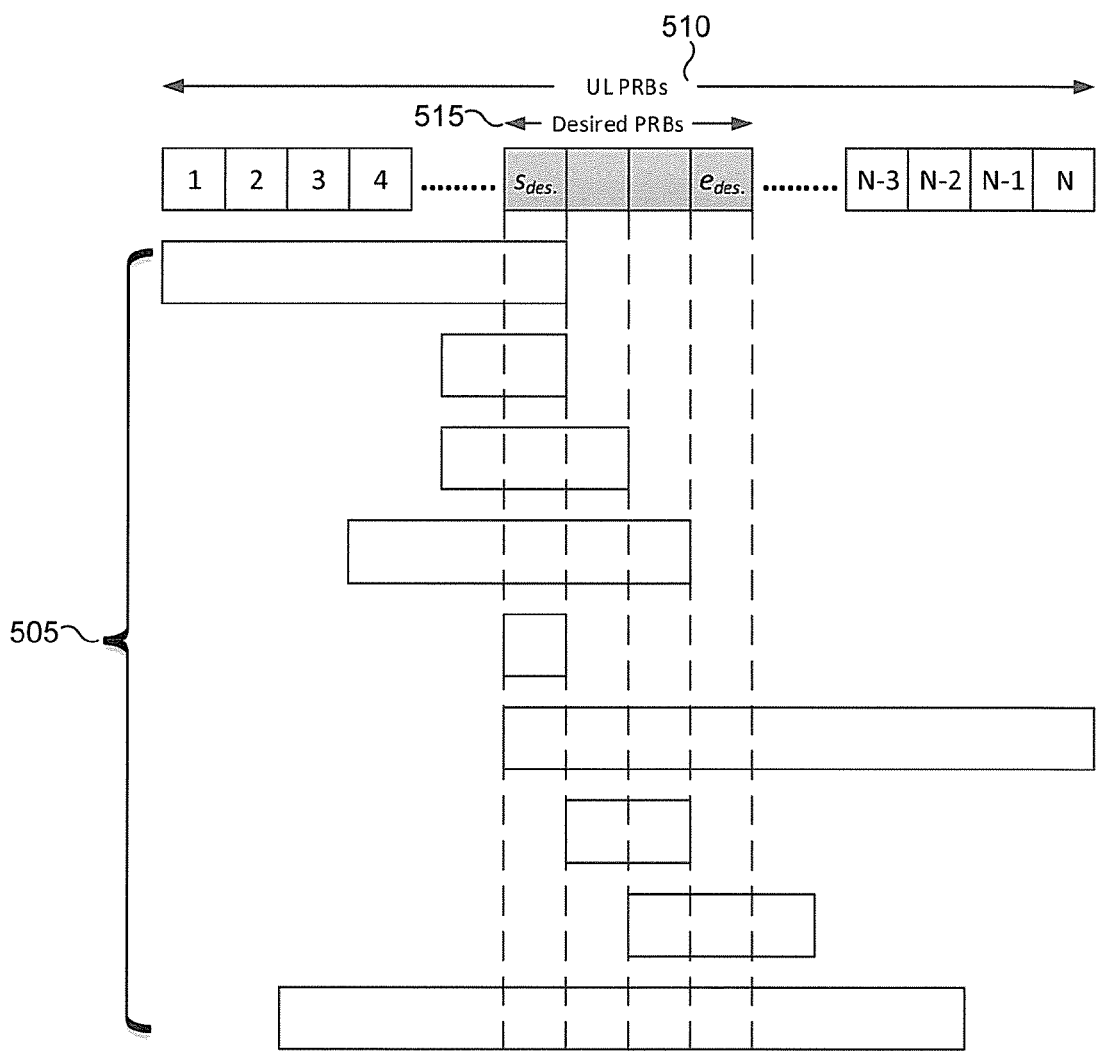
FIG. 5 illustrates several candidate interference BW's according to this disclosure.

FIG. 5 illustrates several candidate interference BW's 505 according to this disclosure. The embodiment shown in FIG. 5 is for illustration only. Other embodiments could be used without departing from the scope of the present disclosure. FIG. 5 provides a set of uplink PRBs 510 with a subset of desired PRBs 515.

The main operation of the BIS block (step 410 of FIG. 4) is to output a set of candidate interfering DMRS sequences, which are parameterized by (u, $n_{cs}$, n, k) parameters, where:
$u \in U_0$, set of all u of adjacent cells, $n_{cs} \in \{0, \ldots, 11\}$, cyclic shift, n=number of allocated PRBs, and k=PRB offset.

Note that (n, k) determines the PRB indices allocated to a user (i.e., user BW).

The BIS starts with estimating interfering BWs of dominant interferers. For this, the set I of all possible interfering BWs that overlap with at least one PRB of the desired user's BW:

$$I = \{(s, e): s \leq e_{des.}, e \geq s_{des.}, e \geq s,$$

s and e are UL PRB indices in the system BW}, where $s_{des.}$ and $e_{des.}$ respectively are the start and the end PRB indices of the desired user's BW. FIG. 5 illustrates several candidate interference BWs 505 that belong to set I. Since the size of set I can be large for practical systems, fully exhaustive search over all interfering BWs in I has very high complexity. Therefore, one or more embodiments herein reduce the search space while maintaining the performance close to the full search.

Figure 6:
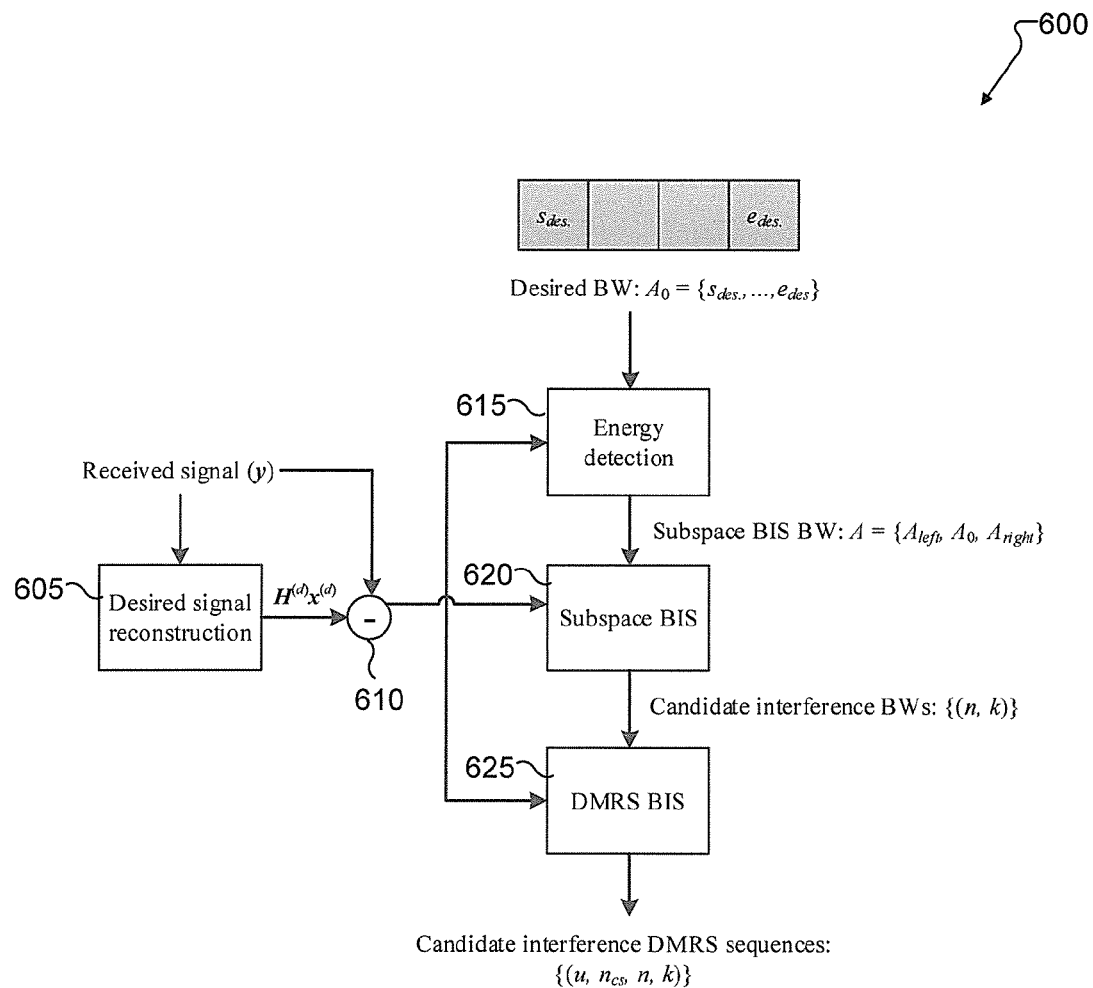
FIG. 6 illustrates process for a subspace-based BIS operation according to this disclosure.

FIG. 6 illustrates process 600 for a subspace-based BIS operation according to this disclosure. The embodiment shown in FIG. 6 is for illustration only. Other embodiments could be used without departing from the scope of the present disclosure. A processor, such as controller/processor 225 as shown in FIG. 2, can perform different steps of the subspace-based BIS operation in process 600.

At step 605 the processor performs desired signal reconstruction. For example, from the estimated desired channel ($H^{(d)}$) and estimated desired symbols ($x^{(d)}$) as $H^{(d)}x^{(d)}$. The desired channel may be estimated from DMRS measurements and the desired symbols may be estimated from soft bits (LLRs) to modulation symbol mapping. At step 610, the reconstructed desired signal is subtracted from the received signal (y).

At step 615, the resultant signal $y - H^{(d)}x^{(d)}$ and the desired BW $A_0 = \{s_{des.}, \ldots, e_{des.}\}$ are used to perform energy detection to detect the presence of interference outside the desired BW $A_0$, but within the whole UL BW. The result of step 615 is subspace BIS BW, which is a set $A = \{A_{left}, A_0, A_{right}\}$ consisting of indices of UL PRBs in desired BW ($A_0$) and to the left ($A_{left}$) and to the right ($A_{right}$) of desired BW.

At step 620, the processor performs an interference case detection for each pair of consecutive RBs in A and outputs a set of candidate interferference BWs {(n, k)}. At step 625, the DMRS sequence detection is carried out only for the candidate interference BWs. This detection may be based on the cross-correlation between the received signal after desired signal subtraction ($y - H^{(d)}x^{(d)}$) and all possible DMRS sequences {(u, $n_{cs}$, n, k)} that satisfy:
  $u \in U_0$, set of all u of adjacent cells
  $n_{cs} \in \{0, \ldots, 11\}$, cyclic shift, and
  (n, k) is a candidate interference BW from step 615.

The processor searches for the candidate DMRS sequences that have large correlation with the received signal. Based on the cross-correlation values, a set of candidate interference DMRS sequences is obtained, which is then used for IS/IC. An embodiment of this disclosure provides a method to perform IS/IC when potentially multiple interference DMRS sequences are detected by the BIS.

One or more embodiments of this disclosure recognize and take into account that after a set of possible candidate interferers is detected from the BIS, suppressing or cancelling all of them at once may not be a desirable approach. The reason could be:

It is not physically possible for some or all of the interferers to exist simultaneously. For example, two candidate interferers occupy overlapping PRBs, but the interferers have the same DMRS group number, implying that the same cell serves the interferers. On the other hand, however, the scheduled PRBs of users served by the same cell should not overlap. Therefore, these candidate interferers cannot exist simultaneously.

The parameters necessary for IS/IC cannot be accurately estimated for all candidate interferers occupying the same band (overlapping PRBs).

There may be constraints for specific scenarios.

There may be system related constraints such as the maximum number of IS/IC attempts and additional complexity of the IS/IC operation.

One or more embodiments of this disclosure define an interference map as a subset of candidate interferers that the processor can suppress/cancel in one IS/IC attempt.

Figure 7:
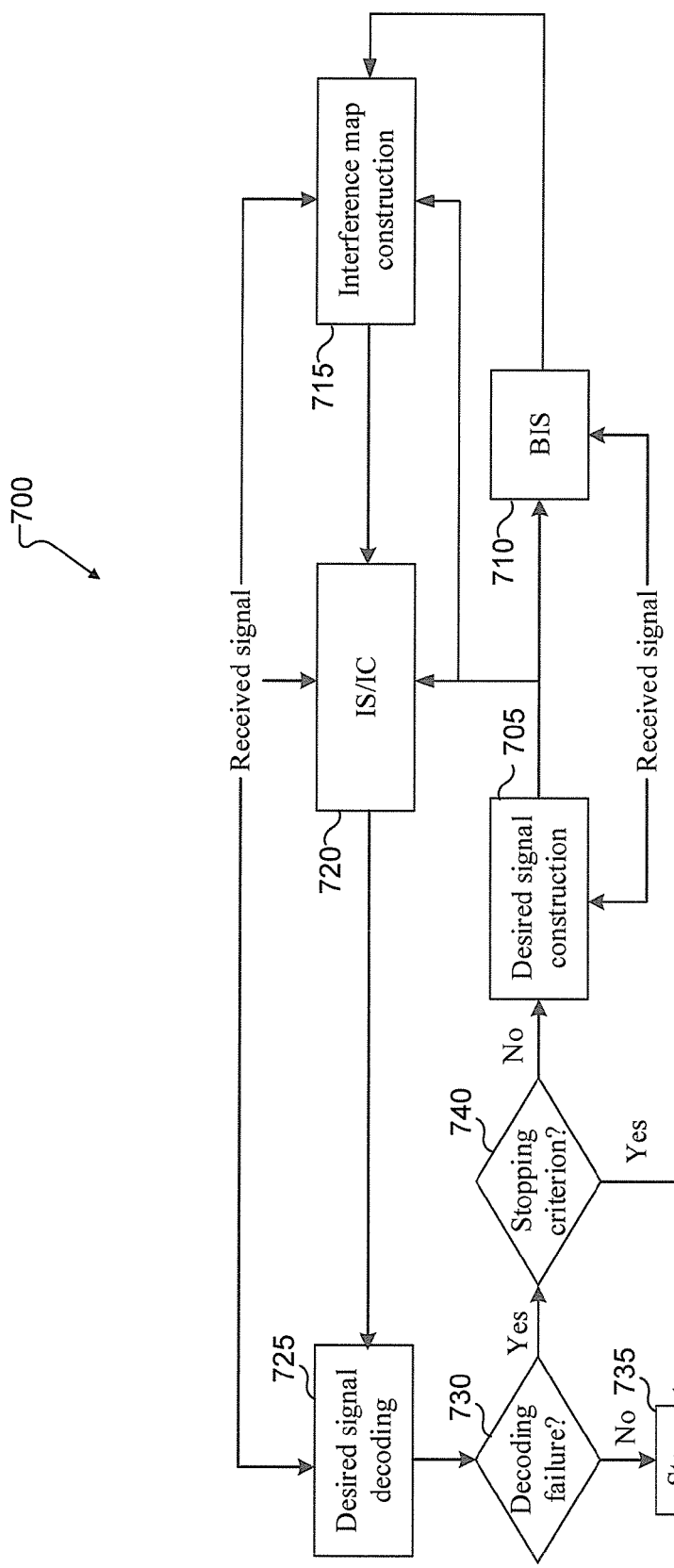
FIG. 7 illustrates process for an interference map construction according to this disclosure.

FIG. 7 illustrates process 700 for an interference map construction according to this disclosure. The embodiment shown in FIG. 7 is for illustration only. Other embodiments could be used without departing from the scope of the present disclosure. A processor, such as controller/processor 225 as shown in FIG. 2, can perform different steps of the interference map construction in process 700.

In one or more embodiments of this disclosure, at step 705, a processor can perform desired signal processing and subtraction. At step 710, the set of candidate interference DMRS sequences from the BIS output is supplied to the interference map construction block.

At step 715, the processor determines a set of interference maps, for the IS/IC block, that meet certain design constraints such as the ones mentioned above. In addition, these interference maps are sorted based on metrics. As used herein, metrics can also be referred to as criteria or rules. From this sorted set of interference maps, at step 720, the IS/IC block iteratively performs IS/IC operations starting from the best interference map until either desired signal is successfully decoded or the iteration terminates at the last interference map.

At step 725, the processor can perform desired signal decoding. At step 730, the processor can determine whether there is a decoding failure. If there is not a decoding failure, at step 735, the process 700 stops. If there is a decoding failure, at step 740, the processor determines whether a stopping criterion is met. If the stopping criterion is met, then at step 735, the process 700 stops. If the stopping criterion is not met, then the process 700 repeats at step 705.

In one embodiment, if there is more than one interferer in an interference map, then the multiple interferers may be suppressed/cancelled together. In an alternate method, the multiple interferers may be suppressed/cancelled one-by-one. For the later method, interferers in the same inference map may be sorted based on a metric.

Figure 8:
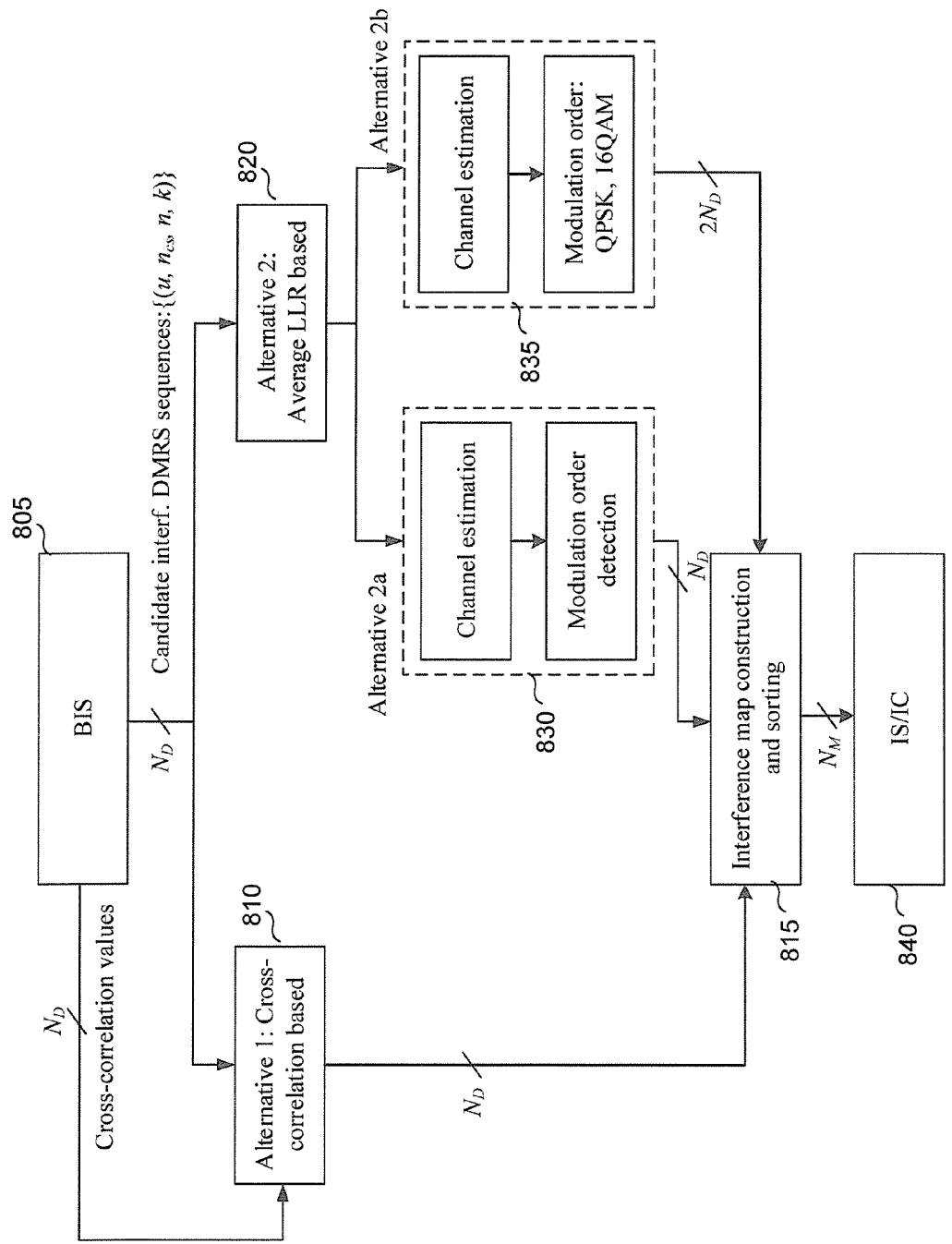
FIG. 8 illustrates process with different alternative embodiments for interference map construction according to this disclosure.

FIG. 8 illustrates process 800 with different alternative embodiments for interference map construction according to this disclosure. The embodiment shown in FIG. 8 is for illustration only. Other embodiments could be used without departing from the scope of the present disclosure. A processor, such as controller/processor 225 as shown in FIG. 2, can perform different steps of the interference map construction in process 800.

At step 805, the processor performs BIS and produces cross-correlation values and candidate interference DMRS sequences. In a first alternative, at step 810, cross-correlation values from the BIS block that correspond to $N_D$ candidate interferers are used in interference map construction and sorting. At step 815, the processor performs interference map construction and sorting.

In a second alternative, at step 820, the processor uses LLR for interference map construction and sorting. In alternative 2a at step 830, the processor uses an average LLR calculated based on channel estimation and modulation order detection for each candidate interferer. In alternative 2b at step 835, the processor uses average LLR calculated based on channel estimation and all modulation order hypotheses (i.e., QPSK and 16QAM) for each candidate interferer. In one example, the number of hypotheses is doubled ($2N_D$) for this alternative. At step 815, the processor performs interference map construction and sorting.

At step 840, based on the interference map sorting, $N_M$ interference maps may be considered for IS/IC. The value of $N_M$ may be chosen based on interference scenarios and system constraints.

In an example embodiment for a channel estimation algorithm, the processor may multiply the received signal in DMRS slots with the DMRS sequence, normalized by power:

$$\tilde{H}_k = \frac{y_k p_k^*}{|p_k|^2} = H_k + \tilde{n}_k,$$

where $\tilde{H}_k$ is the estimated channel at the k-th subcarrier of the DMRS symbol, $p_k$ is the DMRS at the k-th subcarrier, $y_k$ is the received DMRS signal at the k-th subcarrier, and $\tilde{n}_k$ is ther noise term at the k-th subcarrier. To suppress noise $\tilde{n}_k$, filtering based on SINR estimation may be applied. For example, if SINR>0 dB, Wiener filter may be chosen and if SINR≤0 dB, moving average filter may be adopted. Using channel estimates $\tilde{H}$ of the DMRS symbols, channel estimates of the data symbols may be obtained by interpolation.

In an example embodiment for Modulation Order Detection, the processor may first perform MMSE-IRC equalization:

$$\tilde{x}_k = H_k^H R_k^{-1} y_k,$$

where $R_k = H_k H_k^H + K_N$ and $K_N$ is the noise covariance matrix which may be estimated with received DMRS samples in multiple RBs. The processor may then take IDFT of $\tilde{x}$ to convert it into the time domain:

$$\hat{x} = D^{-1} \tilde{x},$$

where D is the IDFT matrix. The processor may then calculate the log likelihood (LL) for each candidate modulation order as follows:

$$LL = \log \Pi_{k=1}^{N_{RE}^{Data}} \frac{1}{|A|} \sum_{s \in A} \exp\left(-\frac{|\hat{x}_k - s|^2}{\sigma^2}\right),$$

where A is the alphabet of the modulation order hypothesis, $\sigma^2$ is the estimated noise variance, and $N_{RE}^{Data}$ is the number of data REs. Finally, the modulation order with maximum LL value may be chosen as the detected modulation order.

Embodiments on Interference Map Construction:

Although in the following embodiments, the average LLR can be the metric to construct and sort interference maps, the embodiments are general and cover any other metric such as the cross-correlation. As shown in FIGS. 9-14, each uses an example number of interferers 905-920 in one of Cell 1 or Cell 2, and a desired user 925. Each interferer 905-920 and the desired user 925 include a number of PRBs 930.

Figure 9:
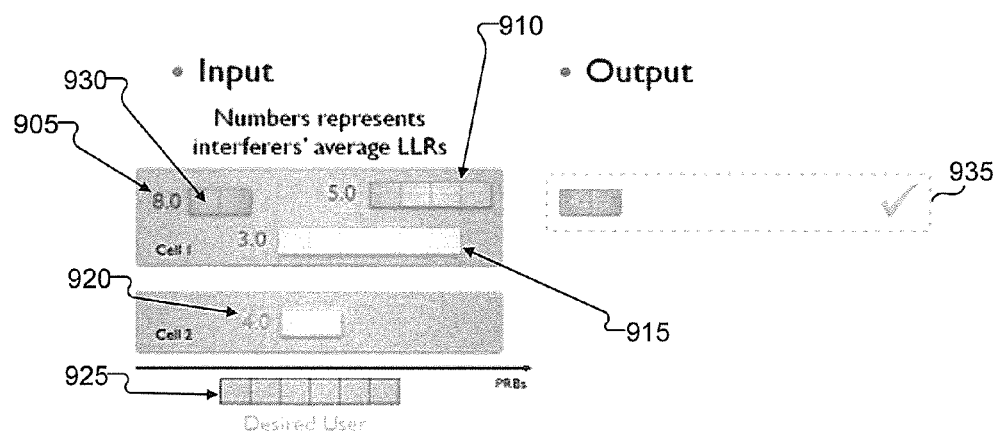
FIG. 9 illustrates a representation of one-interferer interference map construction according to this disclosure.

FIG. 9 illustrates a representation of one-interferer interference map construction according to this disclosure. The embodiment shown in FIG. 9 is for illustration only. Other embodiments could be used without departing from the scope of the present disclosure.

In one or more embodiments of this disclosure, the processor may focus on the IS/IC of the dominant interferer about which there is the greatest likelihood that the dominant interferer is correctly detected. The interference map 935 consists of only one interferer, interferer 905, with the maximum average LLR of 8.0.

Figure 10:
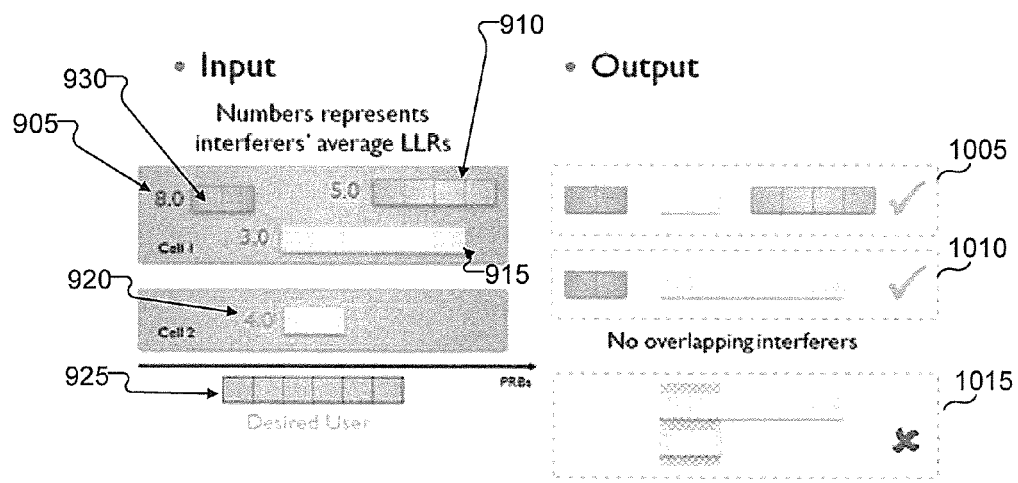
FIG. 10 illustrates a representation of one-layer interference map construction according to this disclosure.

FIG. 10 illustrates a representation of one-layer interference map construction according to this disclosure. The embodiment shown in FIG. 10 is for illustration only. Other embodiments could be used without departing from the scope of the present disclosure. Layer in this context is defined as the maximum number of interferers occupying the same RB.

In one or more embodiments of this disclosure, the processor may only consider one layer of interferers in the IS/IC attempt. The reason may be that for a particular BW, the DMRS parameter estimation, channel estimation, and modulation order detection may be accurate only for the most dominant user. Therefore, the IS/IC of only the first layer of interferers is desired.

The interferers in a one-layer interference map could come from one or more cells. In the example shown in FIG. 10, two layers of interferers are present in the BW of interest. However, it may be desirable to down select the interferers so that only one layer of interferers is considered in the IS/IC attempt. In the upper valid map 1005, two interferers come from Cell 1 and the other one comes from Cell 2. In the lower valid map 1010, however, all interferers come from Cell 1. Invalid map 1015 is invalid because two of the interferers 915 and 920 overlap.

Figure 11:
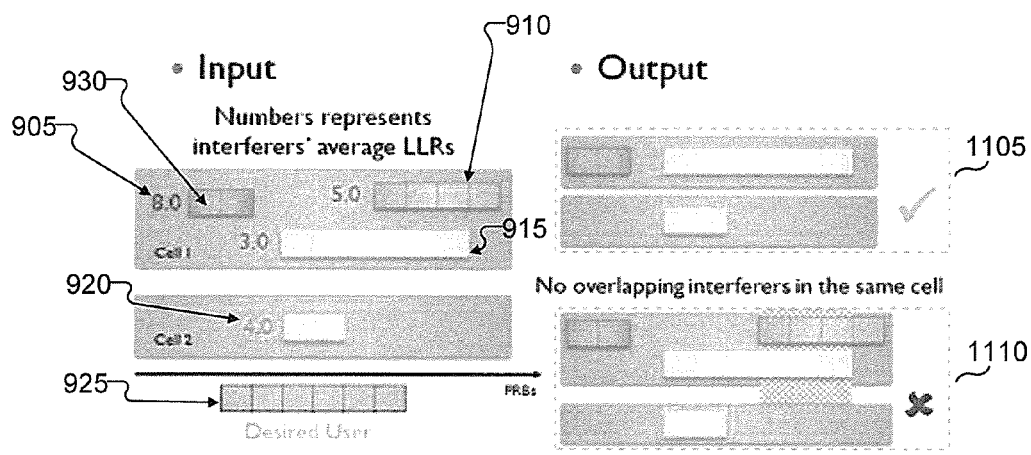
FIG. 11 illustrates a representation of multi-layer interference map construction according to this disclosure.

FIG. 11 illustrates a representation of multi-layer interference map construction according to this disclosure. The embodiment shown in FIG. 11 is for illustration only. Other embodiments could be used without departing from the scope of the present disclosure.

In one or more embodiments of this disclosure, multiple layers of interferers may be desired in the IS/IC attempt. A multi-layer interference map may consist of two or more interferers occupying, partially or completely, overlapping BW. The same cell should not serve these interferers if there is no UL MU-MIMO. In the example shown in FIGUR 10, it is not possible to have the two interferers with average LLRs of 3.0 and 5.0 TO exist simultaneously as the same cell serves them and yet have partially overlapping BW. Interference map 1105 shows a valid mapping while interference map 1110 shows an invalid mapping where interferers 910 and 915 from the same cell, Cell 1, are overlapping.

Embodiments on Interference Map Sorting:

Since IS/IC of some interferers are more helpful for desired user decoding than others, it may be desirable to suppress/cancel the interference map that is most helpful first. A metric can be used to sort or prioritize the maps after they are constructed. Out of all constructed maps, the maps with maximum metric can be adopted in the IS/IC attempts.

Figure 12:
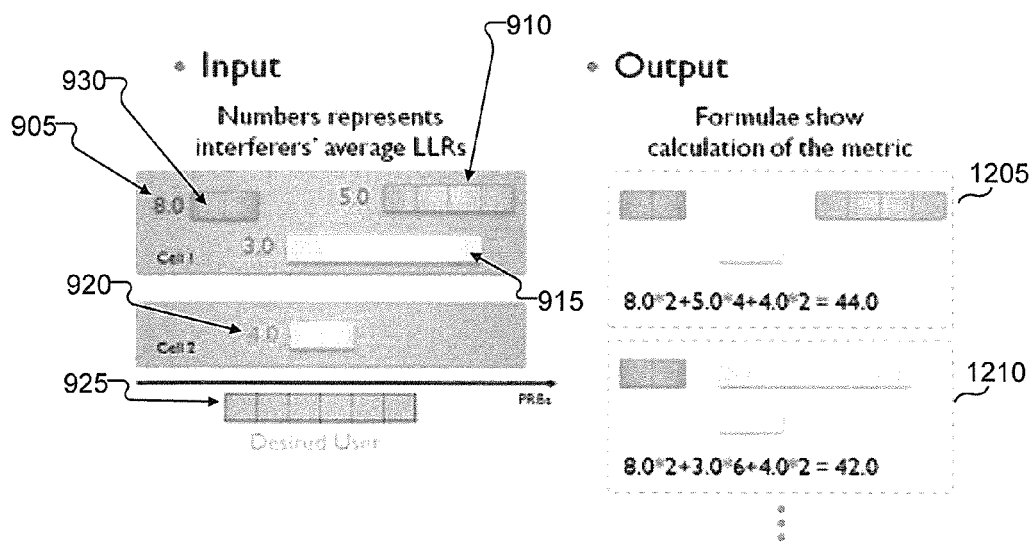
FIG. 12 illustrates a representation of map sorting using a total LLR metric calculation according to this disclosure.

FIG. 12 illustrates a representation of map sorting using a total LLR metric calculation according to this disclosure. The embodiment shown in FIG. 12 is for illustration only. Other embodiments could be used without departing from the scope of the present disclosure.

In one or more embodiments of this disclosure, total LLR may be used to prioritize the maps comprising interferers with higher LLR and larger BW. The total LLR metric may be defined as $M_1 = \Sigma_{i \ in \ map} LLR(i) \times N(i)$, where $LLR(i)$ and $N(i)$ are average LLR and number of allocated PRBs of interferer i in the map.

An example illustration is shown in

There are four candidate interferers, shown on the left. The total LLR metric calculations for two interference maps are shown on the right. As shown, the inference map 1205 on the top has larger total LLR value and therefore has preference over the bottom interference map 1210.

Figure 13:
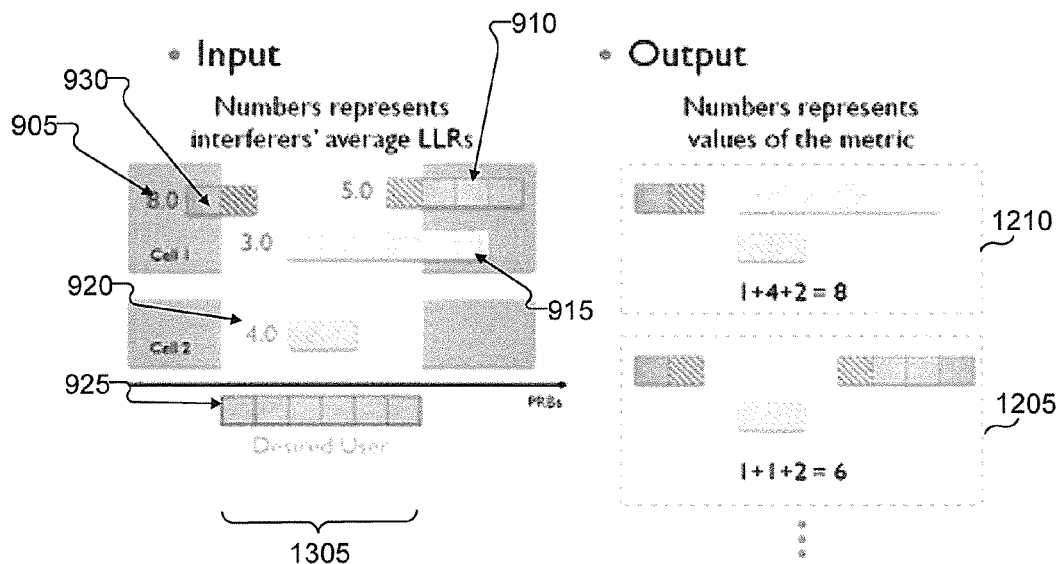
FIG. 13 illustrates a representation of map sorting using a number of overlapping PRBs according to this disclosure.

FIG. 13 illustrates a representation of map sorting using a number of overlapping PRBs according to this disclosure. The embodiment shown in FIG. 13 is for illustration only. Other embodiments could be used without departing from the scope of the present disclosure.

In one or more embodiments of this disclosure, some interferers may have larger LLRs but have very limited BW overlap (e.g. 1 RB) with the RPB range 1305 of the desired user compared to other interferers which have smaller LLRs but have large overlap (e.g. complete overlap) with the RPB range 1305 of the desired user. Larger priorities are given to interferers with greater overlap, and render a more severe obstacle to decode the desired user successfully.

The overlap between the candidate interference PRBs and the desired user PRBs is shown in the middle portion of the left side figure. As shown, the preference order of the two interference maps is reversed from FIG. 13 (compared to the total LLR metric) with this metric. The interference map 1210 has a higher priority than interference map 1205.

Figure 14:
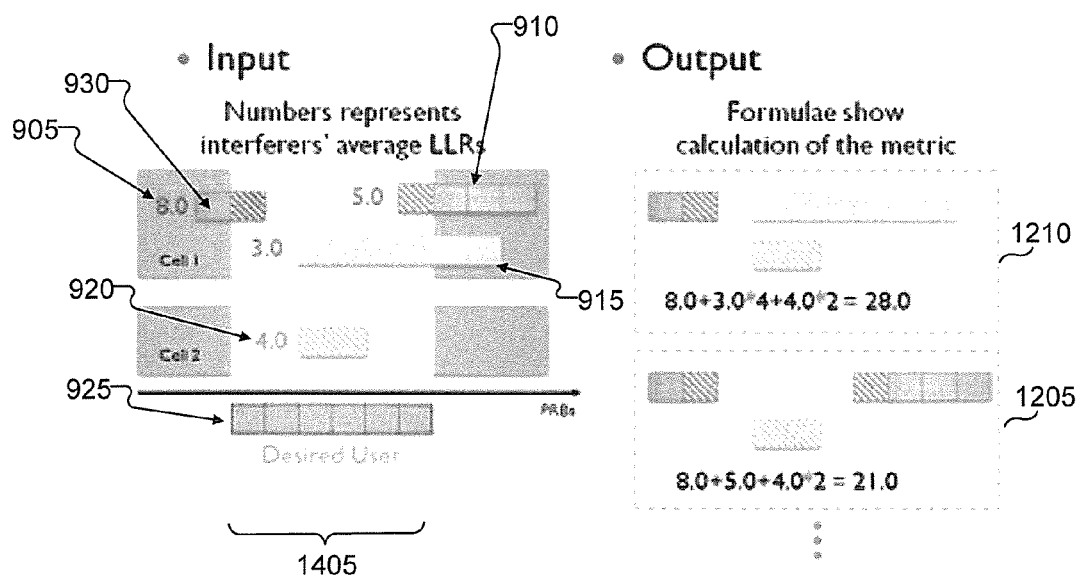
FIG. 14 illustrates a representation of map sorting using LLR in overlapping PRBs according to this disclosure.

FIG. 14 illustrates a representation of map sorting using LLR in overlapping PRBs according to this disclosure. The embodiment shown in FIG. 14 is for illustration only. Other embodiments could be used without departing from the scope of the present disclosure.

In one or more embodiments of this disclosure, LLR in overlapping PRBs (with the desired user) may be used to prioritize the maps comprising interferers with higher LLR and larger BW overlap with the desired user. Note that this metric is the combination of the previous two metrics shown in FIGS. 12 and 13 and both factors affecting the successful decoding of the desired user discussed above are accounted by this metric.

As shown in FIG. 14, although the interferer shaded in purple has a higher average LLR, indicating higher likelihood that it is detected correctly, it overlaps with the desired user, however, by only one RB. The interferer shaded in green, on the other hand, overlaps with the desired user by four RBs and still has a reasonably large average LLR. Eventually, suppressing or cancelling the green interferer may be more helpful to successfully decode the desired user.

Figure 15:
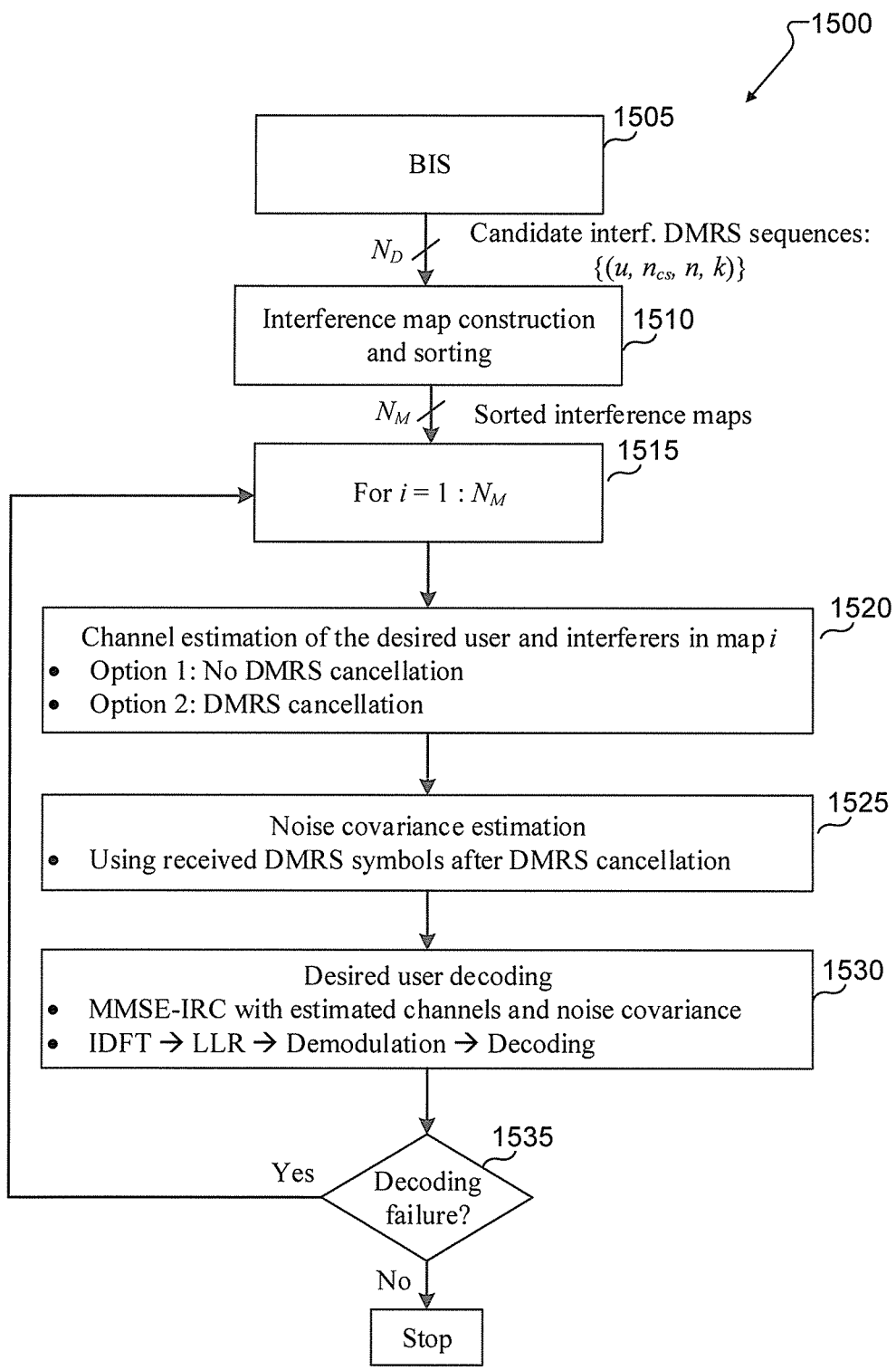
FIG. 15 illustrates process for single IS attempt according to this disclosure.

FIG. 15 illustrates process 1500 for single IS attempt according to this disclosure. The embodiment shown in FIG. 15 is for illustration only. Other embodiments could be used without departing from the scope of the present disclosure. A processor, such as controller/processor 225 as shown in FIG. 2, can perform different steps of the single IS attempt in process 1500.

In one or more embodiments of this disclosure, when decoding of the desired signal fails, process 1500 can be performed. At step 1505, the processor first applies the BIS algorithm such as the above-mentioned subspace-based BIS algorithm to obtain a set of $N_D$ candidate interference DMRS sequences. At step 1510, the processor then constructs $N_M$ interference maps and sorts the maps based on at least one metric, according to some embodiments of this disclosure. Over this sorted list of interference maps, at step 1515, the processor applies IS iteratively starting with the "best" interference map (for example, interference map with the largest metric value) until either the desired signal is successfully decoded or the iteration terminates at the last interference map.

For IS of interference map i, at step 1520, the processor starts with estimating channels of the desired user and interferers in interference map i either with no DMRS cancellation (option 1) or with DMRS cancellation (option 2). In option 2, the processor first estimates channels of the desired user and interferers using their respective DMRS sequences and received DMRS symbols, then uses the channel estimates to reconstruct contributions of the desired user and interferers in the received DMRS symbols (i.e., estimated channels times DMRS sequences), and finally performs channel estimation of the desired user and interferers again after cancelling out the estimated contributions of the rest of the desired user and/or interferers from the received DMRS symbols. After the channel estimation with one of the two options, at step 1525, the processor estimates noise covariance using the received DMRS symbols after cancelling out the estimated contributions of the desired user and interferers in the received DMRS symbols. At step 1530, the processor uses the estimated channel and noise covariance estimates to perform MMSE-IRC for IS:

$$W_{MMSE-IRC} = (H_{est}H^*_{est} + K_N)^{-1}H^{(d)}$$

$H_{est} = [H^{(d)}\ H^{(i)}]$ denote estimated channels of the desired user and interferers, and $K_N$=noise covariance matrix.

After MMSE-IRC, the remaining operations for the desired user decoding such as IDFT, LLR computation, demodulation, and decoding are performed by the processor.

In an alternate IS embodiment, if there are two or more interferers in an interference map, then instead of suppressing all of the interferers together as in process 1500, the processor may suppress the interferers one-by-one by having an inner loop over sorted interferers in the interference map.

In yet another IS embodiment, the processor may attempt IS using MMSE-IRC based on estimated channel of the desired user (with or without DMRS cancellations) and average covariance matrix obtained using the PUSCH symbols:

$$W_{MMSE-IRC} = C_{PUSCH}^{-1}H^{(d)},$$

where $C_{PUSCH}$=covariance matrix using received PUSCH symbols.

Figure 16:
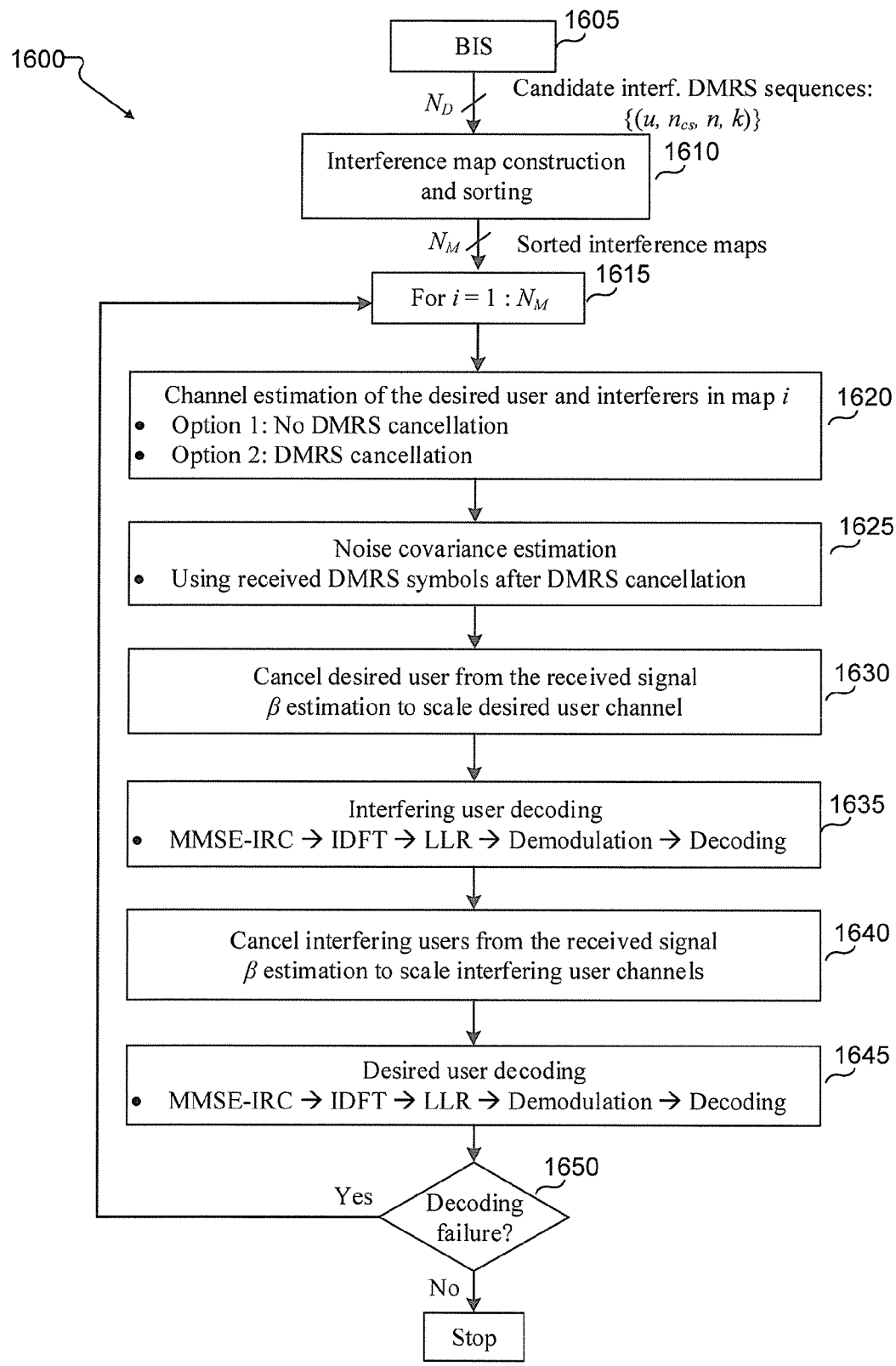
FIG. 16 illustrates process for single IC attempt according to this disclosure.

FIG. 16 illustrates process 1600 for single IC attempt according to this disclosure. The embodiment shown in FIG. 16 is for illustration only. Other embodiments could be used without departing from the scope of the present disclosure. A processor, such as controller/processor 225 as shown in FIG. 2, can perform different steps of the single IC attempt in process 1600.

In one or more embodiments of this disclosure, when decoding of the desired signal fails, the processor may perform the IC operation as shown in FIG. 16. At step 1605, the processor first applies the BIS algorithm such as the above-mentioned subspace-based BIS algorithm to obtain a set of $N_D$ candidate interf. DMRS sequences. At step 1610, the processor then constructs $N_M$ interference maps and sorts them based on at least one metric, according to different embodiments of this disclosure. Over this sorted list of interference maps, the processor applies IC iteratively starting with the "best" interference map (for example, interference map with the largest metric value) until either the desired signal is successfully decoded or the iteration terminates at the last interference map.

For IC of interference map i, at step 1620, the processor starts with the channel estimation of the desired user and interferers in interference map i, either with no DMRS cancellation (option 1) or with DMRS cancellation (option 2), and at step 1625, noise covariance estimation as explained in process 1500 of FIG. 15. At step 1630, the processor then cancels (subtract) the desired user from the received signal. In order to model the residual desired signal in the resultant signal (y-$H^{(d)}x^{(d)}$), the desired channel estimate may be scaled down as $\sqrt{\beta_d}H^{(d)}$, where $\beta_d$ is the scaling parameter. This scaled desired user channel and the resultant signal (y-$H^{(d)}x^{(d)}$) are then used to perform steps (MMSE-IRC, IDFT, LLR, and demodulation) necessary for decoding of all interferers in map i. At step 1635, the processor uses the estimated channel and noise covariance estimates to perform MMSE-IRC for IC.

The processor may detect modulation orders of the interferers for demodulation if the interference map construction is based on cross-correlation. At step 1640, the processor cancels (subtract) interfering users from the received signal, i.e. y-$\Sigma_{j\ in\ map\ i}H^{(j)}x^{(j)}$ and scale down their channel estimates as $\sqrt{\beta_j}H^{(j)}$, where $\beta_j$ is the scaling parameter for interferer j in map i. The scaled interfering user channels and the resultant signal (y-$\Sigma_{j\ in\ map\ i}H^{(j)}x^{(j)}$) are then used to perform the desired user decoding.

In one method, $\beta_d$ may be estimated as $$\beta_d = E[|x_k - \hat{x}_k|^2] = \frac{1}{N_S}\sum_{k=1}^{N_S}\sum_{s_k}|s_k - \hat{s}_k|^2 Pr(s_k|y_k),$$

where $N_S$ is the number of modulated symbols, $s_k$ is the candidate modulation symbol (constellation points), and $\hat{s}_k = \Sigma_{s_k}s_k Pr(s_k|y_k)$ is the soft modulated output. In another method, $\beta_d$ may be estimated using the resultant signal (y-$H^{(d)}x^{(d)}$) after desired user cancellation. In another method, it may be estimated by combining the previous two methods. The parameter $\beta_j$ for interferer j may be similarly estimated.

In an alternate IC embodiment, if there are two or more interferers in an interference map, then instead of cancelling all of the interferers together as in process 1500, the processor may cancel the interferers one-by-one by having an inner loop over sorted interferers in the interference map.

In yet another IC method, the processor may attempt IC using MMSE-IRC based on estimated channel of the desired user (with or without DMRS cancellations) and average covariance matrix obtained using the PUSCH symbols.

Figure 17:
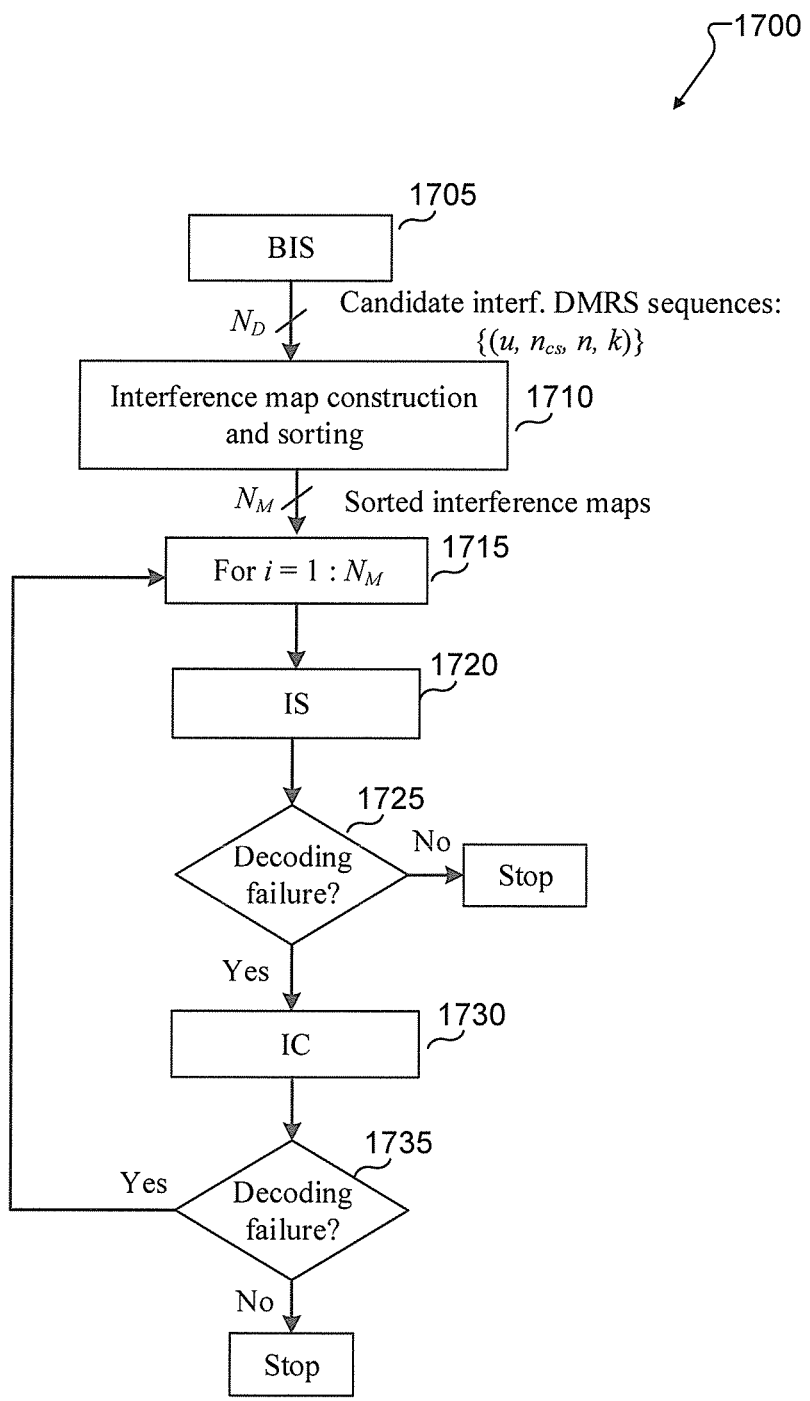
FIG. 17 illustrates process for IS before IC according to this disclosure.

FIG. 17 illustrates process 1700 for IS before IC according to this disclosure. The embodiment shown in FIG. 17 is for illustration only. Other embodiments could be used without departing from the scope of the present disclosure. A processor, such as controller/processor 225 as shown in FIG. 2, can perform different steps of IS before IC in process 1700.

In one or more embodiments of this disclosure, when decoding of the desired signal fails, the processor may first perform IS before IC, and perform IC only if IS does not result in successful desired user decoding, as shown in FIG. 17. Since the complexity of IS is less than IC, the processor may be able to successfully decode the desired user with less complexity. Moreover, the effectiveness of both IS and IC in terms of reducing the number of bit errors can be achieved with this approach. The number of bit errors with IC may be more than that with IS because steps such as desired user cancellation, interfering user cancellation, modulation order detection, and $\beta_d$ and $\beta_j$ estimation involved in IC may not be very accurate.

At step 1705, the processor first applies the BIS algorithm such as the above-mentioned subspace-based BIS algorithm to obtain a set of $N_D$ candidate interf. DMRS sequences. At step 1710, the processor then constructs $N_M$ interference maps and sorts the maps based on at least one metric, according to some embodiments of this disclosure. Over this sorted list of interference maps, at step 1715, the processor applies IS before IC iteratively starting with the "best" interference map (for example, interference map with the largest metric value) until either the desired signal is successfully decoded or the iteration terminates at the last interference map.

At step 1720, the processor applies IS and then at step 1725, determines whether there is a decoding failure. If there is no decoding failure, then process 1700 terminates. If there is a decoding failure, then the processor can apply IC at step 1730. At step 1735, the processor determines whether there is a decoding failure. If there is no decoding failure, then process 1700 terminates. If there is a decoding failure, then the processor repeats part of process 1700 by starting with step 1715.

Figure 18:
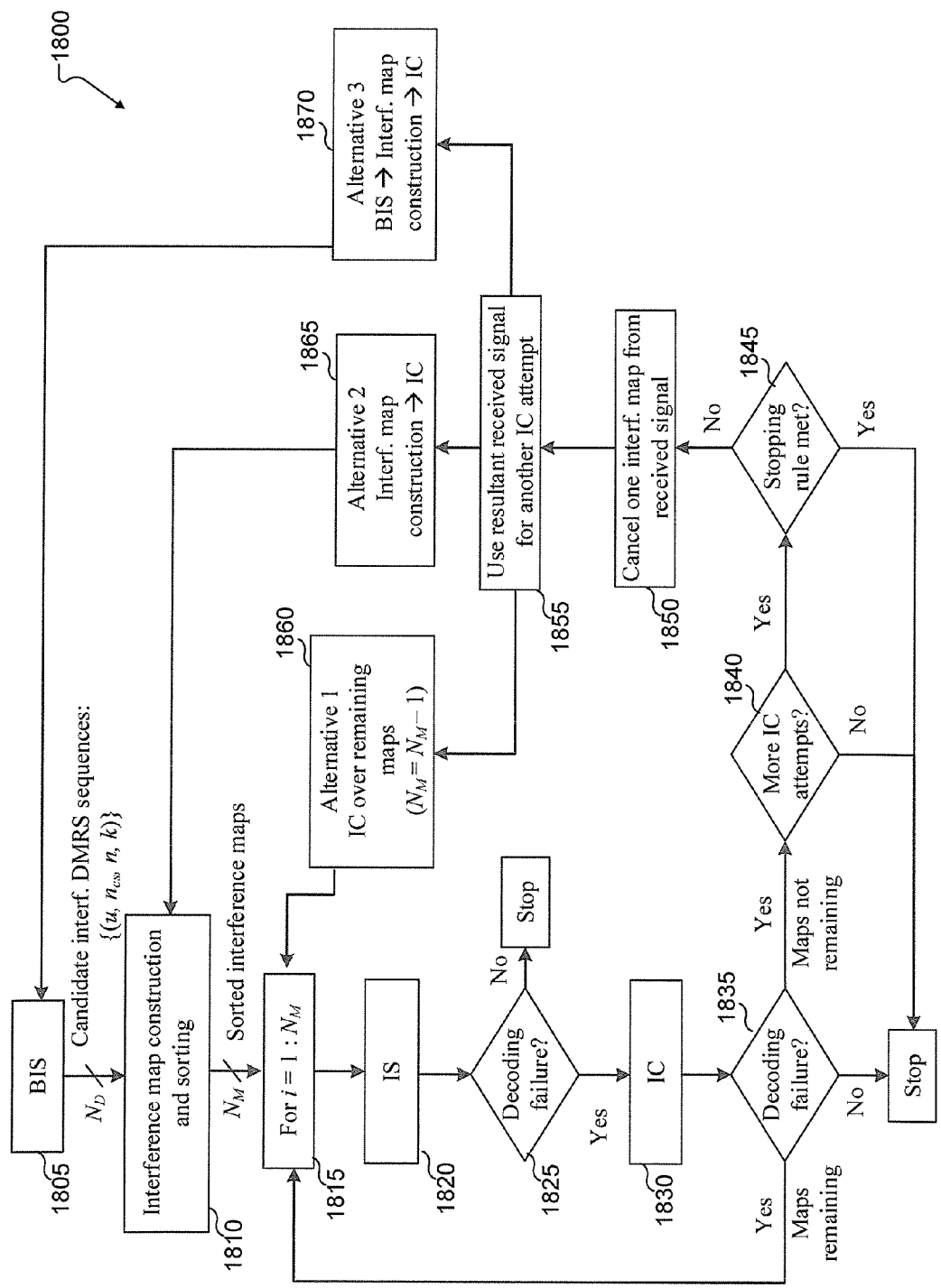
FIG. 18 illustrates process for IS before IC with multiple IC attempts according to this disclosure.

FIG. 18 illustrates process 1800 for IS before IC with multiple IC attempts according to this disclosure. The embodiment shown in FIG. 18 is for illustration only. Other embodiments could be used without departing from the scope of the present disclosure. A processor, such as controller/processor 225 as shown in FIG. 2, can perform different steps of IS before IC in process 1800.

In one or more embodiments of this disclosure, when decoding of the desired signal fails and the first IC attempt does not result in successful decoding of desired user, then the processor may attempt another IC provided the maximum number of IC attempts has not been reached and some stopping rules such as whether the pervious IC attempt helps desired user decoding or not have not been met. Before another IC attempt, the processor cancels one interference map from the received signal and uses the resultant signal for the next IC. The chosen interference map for cancellation may be based on a metric which is a function of cross-correlation values, average LLRs, PRB allocations, or any other parameter of the interferers in the map.

In one example embodiment, steps 1805-1835 may be similar to steps 1705-1735, respectively as show in in FIG. 17. If there is a decoding failure at step 1835, and there are not any maps remaining, at step 1840, the processor determines whether to perform more IC attempts. If the determination is to not perform more IC attempts, then the process 1800 terminates. If the determination is to perform more IC attempts, at step 1845, the processor determines whether stopping rules are met. If the stopping rules are met, then the process 1800 terminates. If the stopping rules are not met, at step 1850, the processor cancels one interference map from the received signal. At step 1855, the processor uses the resultant received signal for another IC attempt.

As shown, in the next IC attempt, the processor may or may not repeat all steps of the previous IC attempt. For example, in alternative 1, at step 1860, the processor performs IC over the remaining $N_M-1$ interference maps from the previous attempt. In alternative 2, at step 1865, the processor performs interference map construction and sorting in order to obtain a new set of interference maps for IC using the resultant signal. The set of candidate interference DMRS sequences remains the same as in the previous IC attempt. In alternative 3, at step 1870, the processor performs BIS to obtain a new of candidate interference DMRS sequences, uses this set to construct and sort interferer maps, and finally performs IC using these maps.

Figure 19:
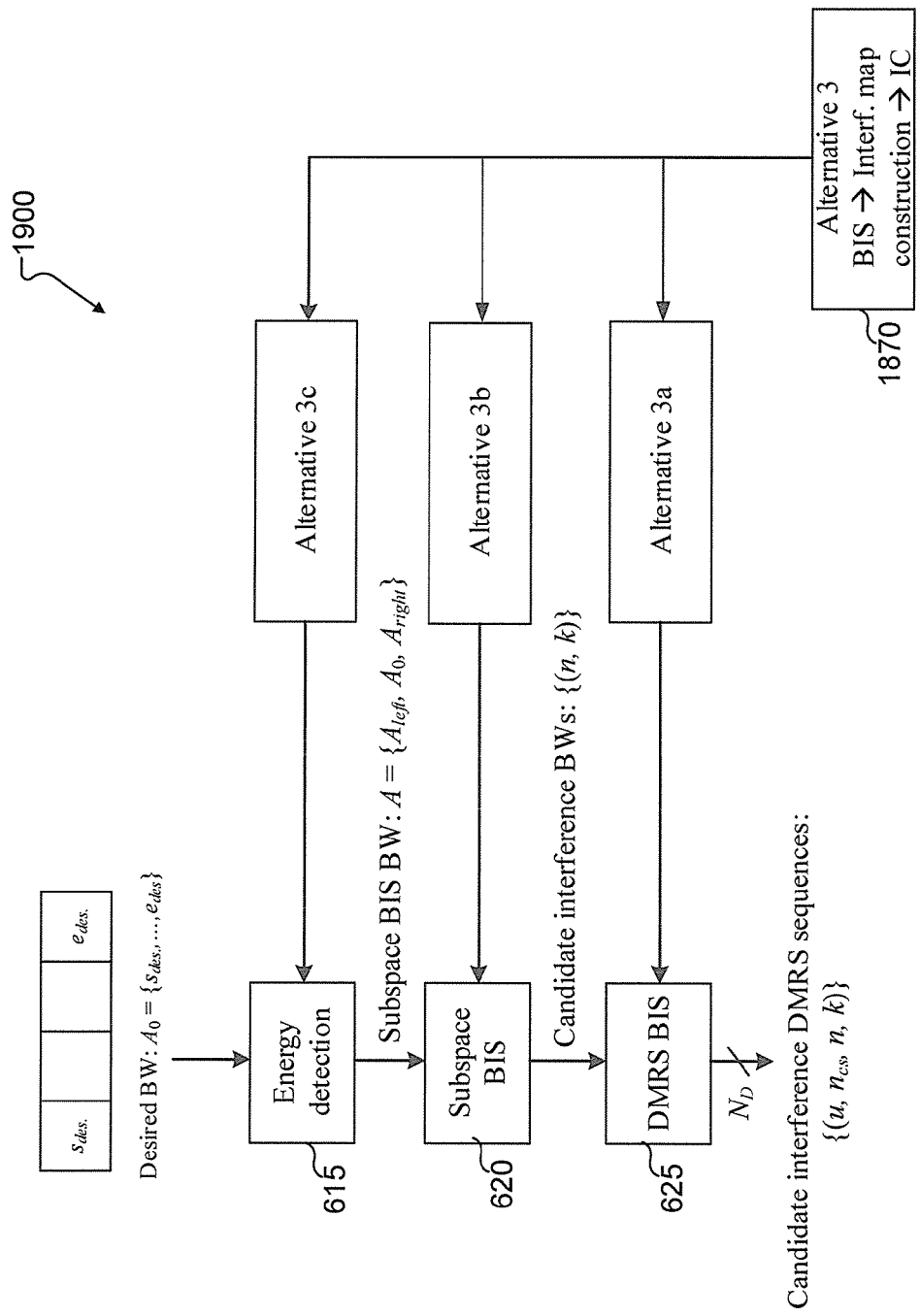
FIG. 19 illustrates process for alternatives to perform BIS according to this disclosure.

FIG. 19 illustrates process 1900 for alternatives to perform BIS according to this disclosure. The embodiment shown in FIG. 19 is for illustration only. Other embodiments could be used without departing from the scope of the present disclosure. A processor, such as controller/processor 225 as shown in FIG. 2, can perform different steps of alternatives to perform BIS in process 1900.

There may be different alternatives to perform BIS in alternative 3 from process 1800 of FIG. 18. Three BIS alternatives are shown in FIG. 19 if the subspace-based BIS is performed. In alternative 3a, only DMRS sequence detection is performed using the set of candidate interference BWs from the previous IC attempt. This alternative may be adopted to keep the BIS complexity low. In alternative 3b, subspace BIS and DMRS BIS are performed using the subspace BIS BW from the previous IC attempt. This method may be adopted if the subspace BIS BW is known to stay the same a priori. In alternative 3c, all three steps of the subspace-based BIS may be performed.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A base station comprising:
   a transceiver configured to receive an uplink signal from each of a plurality of user equipment (UEs), wherein the plurality of UEs comprises desired UEs each with a desired uplink signal and at least one interfering UE with an interfering uplink signal interfering with the received uplink signals; and
   at least one processor configured to:
   identify a set of interfering uplink signals from the at least one interfering UE, the set comprising at least one interfering uplink signal, wherein the at least one interfering uplink signal overlap with at least one PRB of the desired uplink signal;
   identify one or more subsets of interfering uplink signals from the identified set of interfering uplink signals based on one or more metrics each of which is a function of parameters of the interfering uplink signals; and
   perform interference suppression or interference cancellation on at least one of the one or more identified subsets.

2. The base station of claim 1, wherein the at least one processor is further configured to identify a priority over the one or more identified subsets based on a set of rules, and wherein the at least one processor configured to perform the interference suppression or the interference cancellation on the at least one of the one or more identified subsets comprises the at least one processor configured to perform the interference suppression or the interference cancellation on the at least one of the one or more identified subsets based on the priority.

3. The base station of claim 1, wherein the metrics include cross-correlation values calculated using the received uplink signals and estimated interfering signals corresponding to the identified set of interfering uplink signals.

4. The base station of claim 1, wherein the metrics include a log likelihood ratios (LLR) calculated using estimated interfering signal corresponding to each interfering uplink signal in the identified set of interfering uplink signals.

5. The base station of claim 4, wherein the at least one processor is further configured to:
calculate the LLR based on channel estimation and a modulation order detection for each of the interfering uplink signals in the identified set of interfering uplink signals.

6. The base station of claim 4, wherein the at least one processor is further configured to:
calculate a plurality of LLRs based on channel estimation and multiple modulation order detection hypothesis for each interfering uplink signal in the identified set of interfering uplink signals.

7. The base station of claim 4, wherein the at least one processor configured to identify the one or more identified subsets of the interfering uplink signals from the identified set based on the parameters of the interfering uplink signals comprises the at least one processor further configured to:
select an interfering uplink signal, for a subset of the one or more subsets, with a maximum average LLR value.

8. The base station of claim 4, wherein the at least one processor configured to identify the one or more identified subsets of the interfering uplink signals from the identified set based on the parameters of the interfering uplink signals comprises the at least one processor further configured to:
select at least one interfering uplink signal, for a subset of the one or more subsets, with a maximum average LLR value, wherein none of the at least one interfering uplink signal overlap.

9. The base station of claim 4, wherein the at least one processor configured to identify the one or more identified subsets of the interfering uplink signals from the identified set based on the parameters of the interfering uplink signals comprises the at least one processor further configured to:
select at least one interfering uplink signal, for a subset of the one or more subsets, with a maximum average LLR value, wherein none of the at least one interfering uplink signal, of UEs from a same serving cell, overlap.

10. The base station of claim 2, wherein the priority is based on a total LLR of each of the one or more identified subsets.

11. The base station of claim 2, wherein the priority is based on a number of overlapping physical resource blocks in each of the one or more identified subsets.

12. The base station of claim 2, wherein the priority is based on a total LLR of overlapping physical resource blocks in each of the one or more identified subsets.

13. A method comprising:
receiving an uplink signal from each of a plurality of user equipment (UEs), wherein the plurality of UEs comprises desired UEs each with a desired uplink signal and at least one interfering UE with an interfering uplink signal interfering with the received uplink signals; and
identifying a set of interfering uplink signals from the at least one interfering UE, the set comprising at least one interfering uplink signal, wherein the at least one interfering uplink signal overlap with at least one PRB of the desired uplink signal;
identifying one or more subsets of interfering uplink signals from the identified set of interfering uplink signals based on parameters of the interfering uplink signals; and
performing interference suppression or interference cancellation on at least one of the one or more identified subsets.

14. The method of claim 13, further comprising:
identifying a priority over the one or more identified subsets based on a set of rules, and wherein performing the interference suppression or the interference cancellation on the at least one of the one or more identified subsets comprises performing the interference suppression or the interference cancellation on the at least one of the one or more identified subsets based on the priority.

15. The method of claim 13, wherein the metrics includes cross-correlation values calculated using the received uplink signals and estimated interfering signals corresponding to the identified set of interfering uplink signals.

16. The method of claim 13, wherein the metrics includes a log likelihood ratios (LLR) calculated using estimated interfering signal corresponding to each interfering uplink signal in the identified set of interfering uplink signals.

17. The method of claim 16, further comprising:
calculating the LLR based on channel estimation and a modulation order detection for each of the interfering uplink signals in the identified set of interfering uplink signals.

18. The method of claim 16, further comprising:
calculating a plurality of LLRs based on channel estimation and multiple modulation order detection hypothesis for each interfering uplink signal in the identified set of interfering uplink signals.

19. The method of claim 16, wherein identifying the one or more identified subsets of the interfering uplink signals from the identified set based on the parameters of the interfering uplink signals comprises:
selecting an interfering uplink signal, for a subset of the one or more subsets, with a maximum average LLR value.

20. The method of claim 16, wherein identifying the one or more identified subsets of the interfering uplink signals from the identified set based on the parameters of the interfering uplink signals comprises:
selecting at least one interfering uplink signal, for a subset of the one or more subsets, with a maximum average LLR value, wherein none of the at least one interfering uplink signal overlap.

* * * * *